United States Patent

[11] 3,602,380

| [72] | Inventor | Godfrey M. Spencer<br>Topeka, Kans. |
|---|---|---|
| [21] | Appl. No. | 779,798 |
| [22] | Filed | Nov. 29, 1968 |
| [45] | Patented | Aug. 31, 1971 |
| [73] | Assignee | Ernest-Spencer Engineering Company<br>Topeka, Kans. |

[54] MATERIAL DISPENSING APPARATUS HAVING A TAPERED BIN WITH BOTTOM SCREWS AND MATERIAL SUPPORTING AGITATORS
6 Claims, 6 Drawing Figs.

| [52] | U.S. Cl. | 214/17, 198/56, 198/64, 222/238 |
|---|---|---|
| [51] | Int. Cl. | A01f 25/00 |
| [50] | Field of Search | 222/409, 238; 198/56, 64; 214/17 |

[56] References Cited
UNITED STATES PATENTS

| 993,815 | 5/1911 | Beardsley | 222/238 X |
|---|---|---|---|
| 999,295 | 8/1911 | Blue | 222/413 X |
| 1,230,069 | 6/1917 | Gilroy | 222/413 X |
| 1,835,989 | 12/1931 | Hofft et al. | 222/413 X |
| 2,743,850 | 5/1956 | Hamilton | 222/238 |

*Primary Examiner*—Evon C. Blunk
*Assistant Examiner*—H. S. Lane
*Attorney*—Berman, Davidson and Berman ABSTRACT: A material dispensing machine that is provided with a storage bin to receive moist feed and the like with agitator means in the lower portion of the bin to prevent the moist material from bridging or hanging up, and a plurality of screw feed means disposed below said agitator means for conveying the material from the bottom of the bin to a weight hopper and the like.

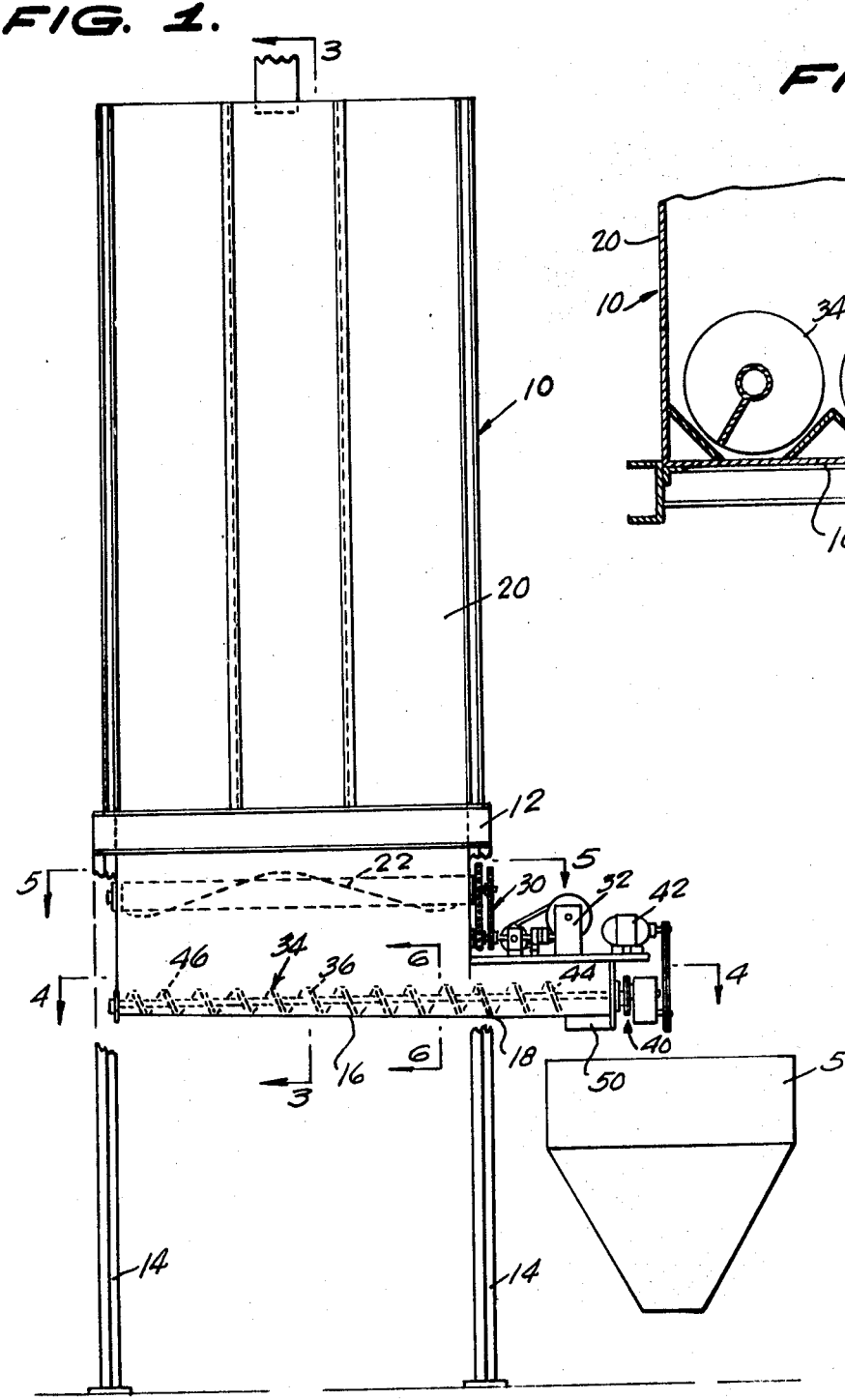
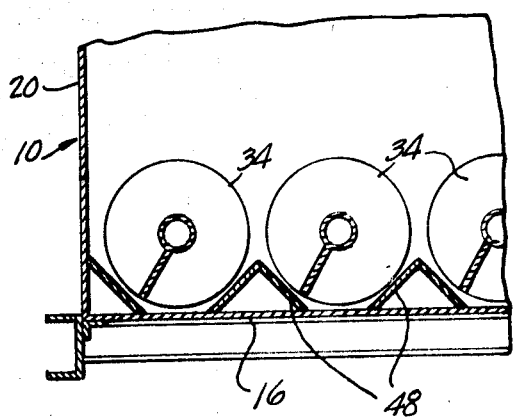

INVENTOR.
GODFREY M. SPENCER,
BY
Berman, Davidson & Berman.
ATTORNEYS.

INVENTOR.
GODFREY M. SPENCER,
BY
Berman, Davidson & Berman
ATTORNEYS.

MATERIAL DISPENSING APPARATUS HAVING A TAPERED BIN WITH BOTTOM SCREWS AND MATERIAL SUPPORTING AGITATORS

The present invention relates to a bin and feeder unit for the storage of a large quantity of moist material such as grain, and an agitator means disposed in the lower part of the bin for maintaining the material in an agitated condition to prevent it from hanging up or binding, and auger feed conveying means disposed below the agitator means for conveying the material out of the bottom portion of the bin to a weighing station.

At the present time, a common method of feeding cattle is to feed cooked grain to the cattle. It has been found that the results are phenomenal in that it has greatly decreased the cost of putting a pound of beef on cattle. The grain is generally processed after being cleaned and flows to a vertical steam cabinet where it is continuously cooked for a predetermined period of time, such as for 30 to 60 minutes. Following the cooking of the grain in live, hot and wet steam at a predetermined temperature, for example, 210° the grain is flaked and is passed through a large roller mill. The grain flakes are then conveyed to a storage bin. The capacity of a flaking mill is in the neighborhood of 4 to 5 tons per hour. The grain flakes are stored or bined in the storage bin or hopper ahead of a suitable weighing system, so they may be proportionately weighed and mixed with other ingredients to make a complete cattle feed.

In accordance with the present invention, a large bin is provided to hold the large quantity and weight of flaked grain and a feeder unit is provided which is fast enough to dispense the flakes at a predetermined rate and which will prevent the flakes from bridging and jamming in the bin.

It is another object of the present invention to provide a storage bin and a feeder unit therefor that will cause the stored moist flakes to flow from the bottom, thereby assuring the operator that the oldest flakes in the bin are discharged first therefrom. Under conventional bin conditions, this will not happen as the moist material in the top of the bin channels its way to the bottom discharge, by passing the material in the bottom, so that the oldest material will not be discharged until the bin is emptied.

It is an object of the present invention to provide a bin and a feeding unit where the storage bin walls are narrower at the top than at the bottom to insure the proper feeding of the moist material from the bin.

It is yet another object of the present invention to provide a bin and feeder unit in which the stored flakes are not allowed to rest directly on the auger feeder means, so that the auger feeder means will not be jammed.

It is yet another object of the present invention to provide a bin and a feeder unit in which the auger feeder means cover substantially the total area of the bottom of the bin, so as to provide a substantially complete movable bottom, and which has no ledges to cause the moist flaked material to bridge or hang up.

It is still a further object of the present invention to provide a bin and a feeder unit which has pipe agitator means disposed above the feeder means for conveying the material therefrom so that the pipe agitator means will support the weight of the flaked material in the storage bin and cause the flakes to feed from the bottom of the bin first, and will prevent the flakes from packing and jamming the screw feeder means therebelow. This result is normally obtained by operating the agitator means at a feed rate less than the feed rate of the feeder means therebelow.

It is yet another object of the present invention to provide a feeder unit for a storage bin in which is disposed a large quantity of moist material and the like, in which agitator means are provided which are activated when the feeder means disposed therebelow are starved for flakes.

It is still a further object of the present invention to provide a screw feeder means in a bin in which the feeder means are tapered, thereby relieving the packing and jamming caused by the moving flakes.

Various other objects and advantages of the present invention will be readily apparent from the following detailed description, when considered in connection with the accompanying drawings forming a part thereof, and in which:

FIG. 1 is a side elevational view of the bin and feeder unit embodying the present invention;

FIG. 6 is an enlarged, fragmentary detailed view taken along the lines 6—6 of FIG 1.

Figure 2:
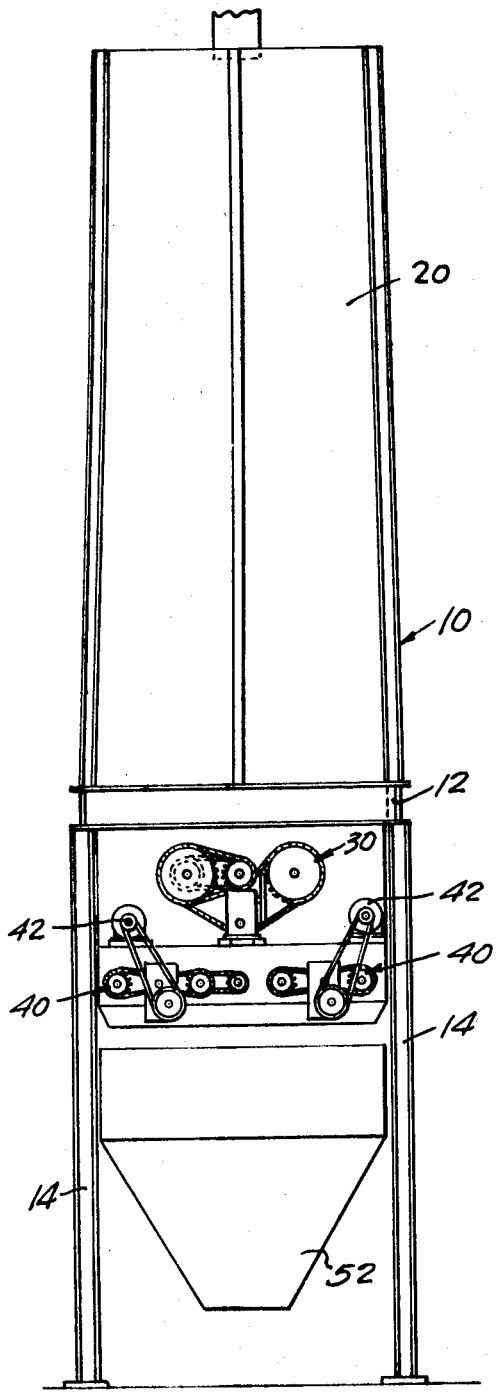
FIG. 2 is a view of the bin and feeder unit shown in FIG. 1, when looking at it from the right side of FIG. 1.
Figure 3:
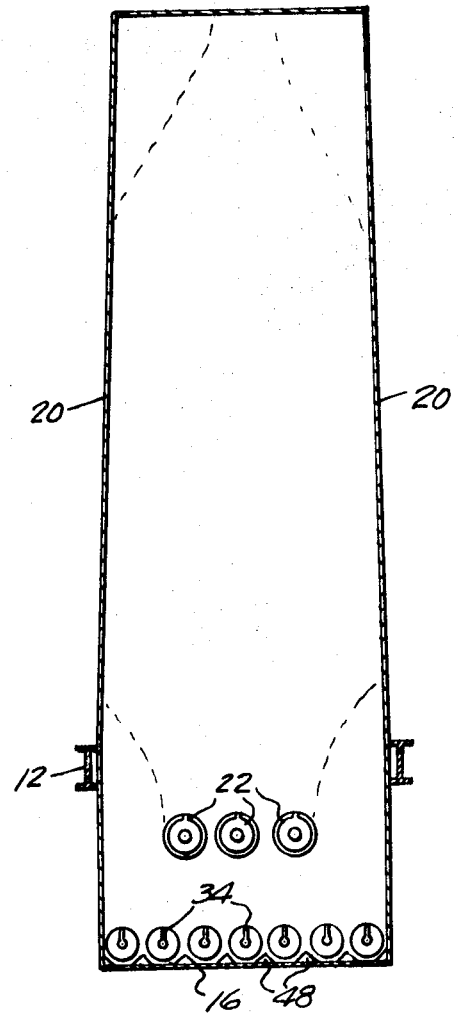
FIG. 3 is a view of the present invention taken along the lines 3—3 of FIG. 1.

Referring to the drawings, the reference numeral 10 generally designates a large storage bin for grain material and the like. The bin is provided with a horizontal girder support member 12 encircling the lower portion of the bin, and a plurality of vertical posts or columns 14.

The bin is open at its upper end for receiving material therein and is provided with a closed bottom 16, which is tapered toward a discharge outlet 18, as best seen in FIG. 1.

It will be noted that the sides 20 of the bin are tapered so that they are narrower adjacent their upper ends and are wider adjacent their lower ends. The purpose of this outward or diverging taper of the bin adjacent its lower end with respect to its upper end is to prevent the flakes or the grains in the bottom from tending to pack and to force the flaked material in movement toward the bottom of the bin, rather than the side, as in conventional bins.

Disposed adjacent the bottom or the lower portion of the bin are three laterally spaced pipe agitator members 22. These pipe agitator members are provided with a central drive shaft, suitably connected at its opposite ends to the sidewalls of the bin, and further provided with a spiral member 26 on the outer surface thereof.

Figure 5:
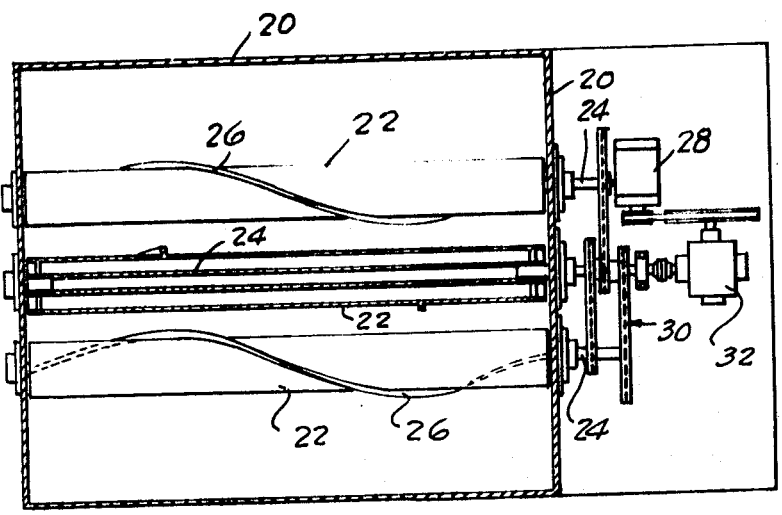
FIG. 5 is a view taken along the lines 5—5 of FIG. 1.

Referring to FIG. 5, the three pipe agitator members 22 are suitably connected to an electric drive motor 28 through suitable sprocket and endless chains, generally designated as 30, and a gear reducer mechanism 32.

Figure 4:
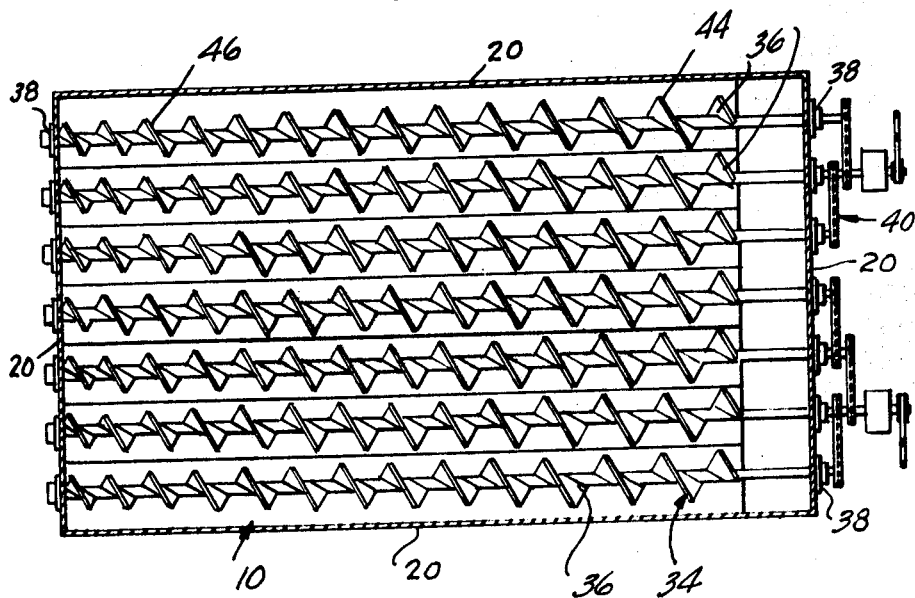
FIG. 4 is a view taken along the lines 4—4 of FIG. 1.

Disposed in spaced relationship below the pipe agitator members 22 is an auger or screw feed means generally designated as 34. The screw feed means includes a plurality of individual screw feed members 36, as best seen in FIG. 4, extending completely across the bottom of the hopper and above the bottom wall 16. Each of the individual screw feed members 36 is provided with bearing means 38 adjacent its opposite ends secured to the side walls of the bin and driven by an endless chain and sprocket device, generally designated as 40, which in turn is driven by an electric motor 42, as best seen in FIG. 1.

The individual screw members 36 are tapered so that they have a larger diameter auger 44 adjacent the discharge end 18 of the bin while their end 46 adjacent the opposite side of the bin is of smaller diameter. The screw feed members 34 are also disposed just above the tapering bottom 16, as best seen in FIGS. 1 and 6, and a plurality of triangular ribs 48 are secured to the bottom 16 with the individual screw feed members 34 disposed therebetween, so as to prevent the material from packing in the bottom of the bin.

The bottom 16 of the bin extends substantially beyond one of the sides 20 thereof, so that the material is discharged through a chute 50 disposed above a weight hopper 52.

Thus, from the foregoing description, it is apparent that the present invention provides a bin and feeder unit in which the bin is tapered with side walls that diverge outwardly with respect to the upper portion of the bin so that the material will freely feed or flow downwardly and prevent bridging or hang up of the moist grain material therein. The present invention further provides a bin and feeder unit so that the stored flakes will flow from the bottom, assuring the operator that the oldest flakes in the bill will be discharged first.

The provision of the screw agitators in the bottom of the bin and the separate drive means therefor insures that the agitators may be independently and intermittently actuated when the screw feeder means therebelow are starved for the product being fed thereto. Under normal operation the agitators are driven at a feed rate less than the feed rate of the feed screws, to assure that the weight of the material in the hopper is not on the feed screws.

The provision of the independent drive means for the plurality of tapered auger means or screw feed means provides a conveyor or feeder unit that is fast enough to dispense the flakes as they are fed or fall to the bottom of the bin.

The provision of the tapered bin bottom and the provision of the tapered screw members thereabove, which taper from a smaller diameter to a larger diameter toward the discharge end of the bottom of the bin, relieves packing and jamming caused by the moving flakes in a conventional feeding unit and bin storage apparatus.

Thus, from the foregoing description, it is apparent that the present invention provides a novel and rigid and inexpensive bin storage device and feeder unit and agitator unit for handling moist, or sticky, or swelled up grain material for feeding to cattle and the like.

From the foregoing description, it will be apparent that various changes may be made in the form, location and relative arrangement of several parts without departing from the essential characteristics of the invention, and is not to be limited except by the scope of the appended claims:

What is claimed is:

1. A large capacity material storage and dispensing unit including a downwardly diverging tapered storage bin adapted to store and dispense tons of wet livestock feed material, said bin having an outlet opening at the lower end of one side thereof, a bottom wall for said bin sloping toward said outlet opening, a plurality of screw feed members extending completely across said bottom wall and projecting through said outlet opening, each of said screw feed members being tapered with its largest portion at the discharge end thereof, the bottom of said screws being substantially parallel to said bottom wall, means for simultaneously rotating said screw feed members, a plurality of horizontal parallel agitator members above said screw feed members in the central portion of said bin laterally spaced so as to entirely support the weight of material in said bin and for selectively agitating and feeding the material to be supplied to said screw feed members at a rate less than the feed rate of said screw members, and means for rotating said agitator members independently of said screw feed members.

2. A device as claimed in claim 1 wherein said agitator members each comprise a hollow pipe journaled in said bin with a spiral vane extending from end to end along the outer surface thereof.

3. A device as claimed in claim 2 wherein said hollow pipe has a second smaller hollow pipe mounted coaxially therein and rigidly secured thereto to reenforce said first named hollow pipe.

4. A device as claimed in claim 1 wherein said agitator members extend completely across said bin in the direction of their axes and are spaced inwardly from the sides of said bin parallel to their axes.

5. A device as claimed in claim 1 wherein said agitator members extend completely across said bin in the direction of their axes generally parallel to the axes of said screw feed members and spaced inwardly from the sides of said bin parallel to the axes of said agitator members.

6. A device as claimed in claim 1 wherein triangular ribs are secured to said bottom wall extending parallel to the axes of said screw feed members between adjacent members and form a plurality of troughs for said screw feed members.